No. 634,613. Patented Oct. 10, 1899.
J. B. DECHERY.
THERMOCAUTERIZER.
(Application filed Feb. 3, 1897.)
(No Model.) 3 Sheets—Sheet 2.
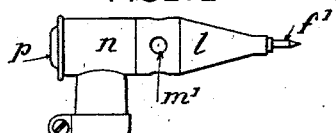
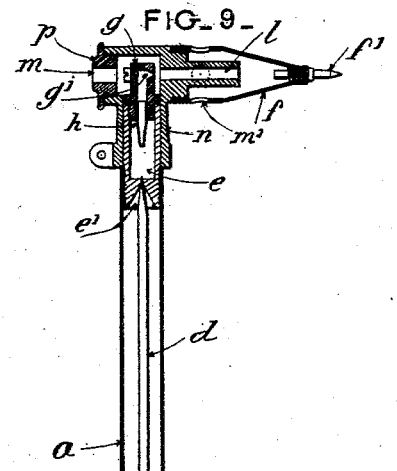
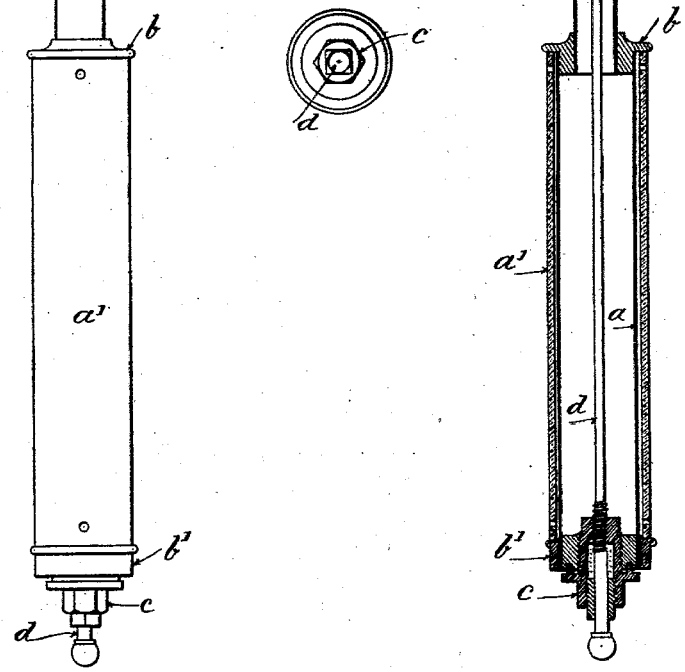
Witnesses:
M. C. Pinckney
C. Holloway
Inventor:
Jean Baptiste Dechery,
By J. E. M. Bowen
Attorney

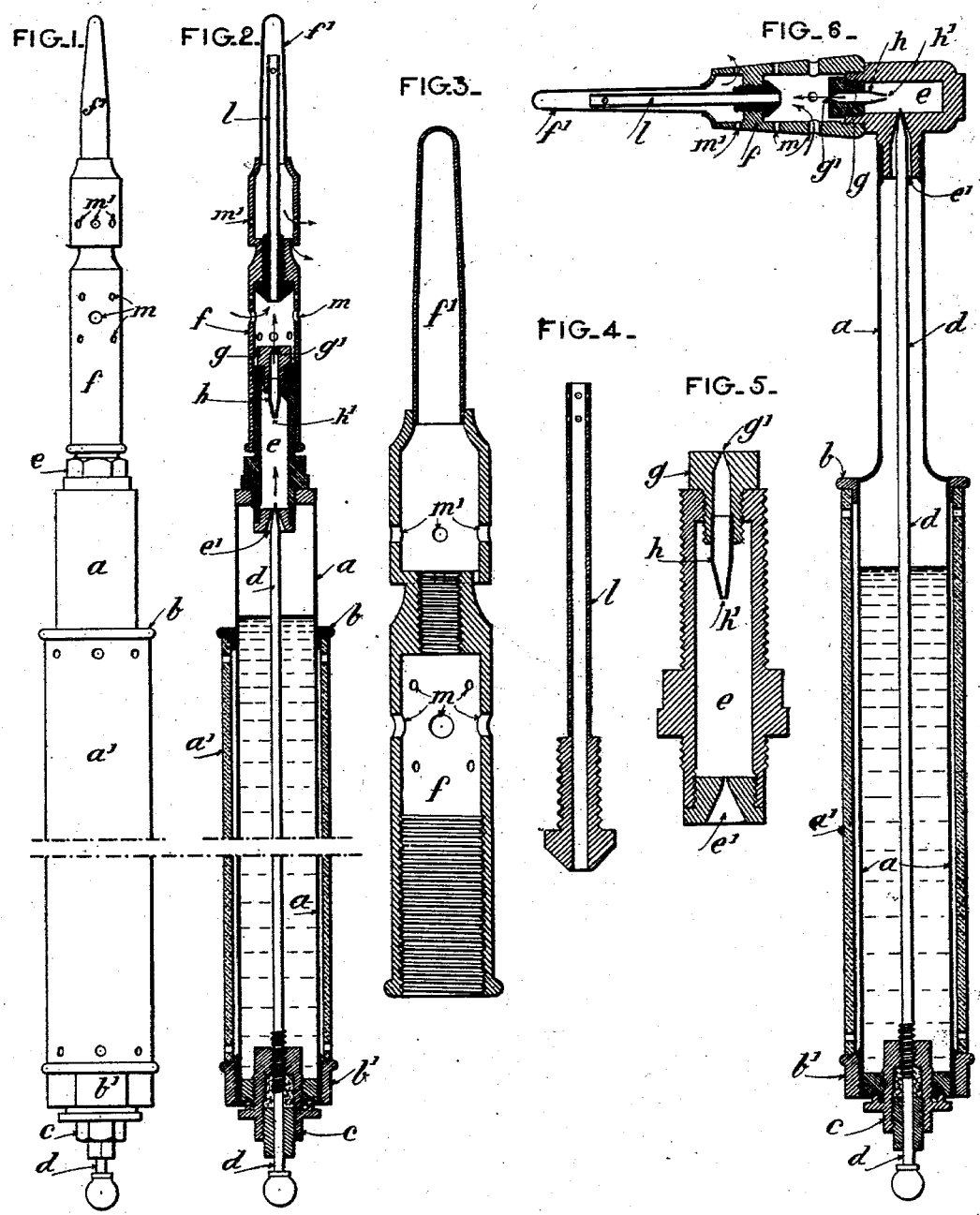

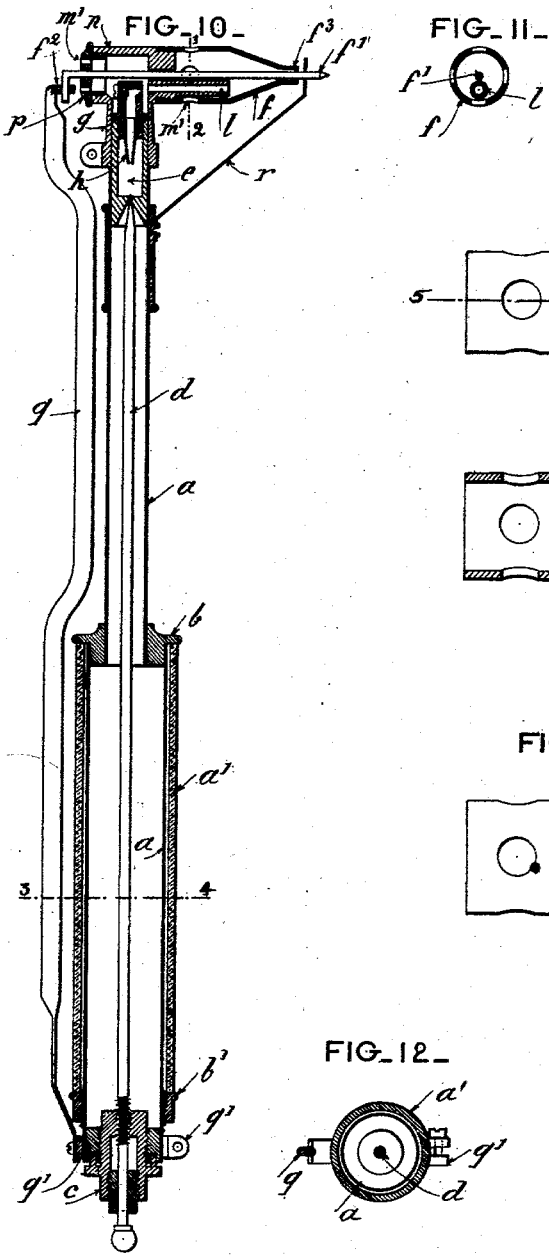

UNITED STATES PATENT OFFICE.

JEAN BAPTISTE DECHERY, OF FISMES, FRANCE.

THERMOCAUTERIZER.

SPECIFICATION forming part of Letters Patent No. 634,613, dated October 10, 1899.

Application filed February 3, 1897. Serial No. 621,762. (No model.)

*To all whom it may concern:*

Be it known that I, JEAN BAPTISTE DECHERY, veterinary surgeon, of Fismes, Marne Department, in the Republic of France, have invented new and useful Improvements in Automatic Thermocauterizers Using Ether, Alcohol, Mineral Essence, the Different Hydrocarburets, or Mixtures of these Different Liquids, (for which I have obtained Letters Patent in France, No. 253,813, dated February 8, 1896, and in Germany, No. 95,324, dated January 30, 1897,) of which the following is a full, clear, and exact description.

My invention relates to an improved thermocauterizer which operates without blowing and by its own heat and uses ether, alcohol, mineral essence, the different hydrocarburets, or the mixtures in variable proportions of these different liquids when soluble the one in the other.

This instrument is suitable for human surgery, but can, when made larger, be used in veterinary surgery. After having put a soldering-iron in place of the cauterizing-point my thermocauterizer becomes suitable for use as a soldering instrument by tinmen, plumbers, and the like.

In the accompanying drawings, Figure 1 is a perspective view of a straight thermocauterizing-iron for use in human surgery. Fig. 2 is a longitudinal section of Fig. 1. Fig. 3 is a detail view, on a larger scale, of the combustion-chamber and the cauterizing-point. Fig. 4 is a corresponding detail view of the platina tube. Fig. 5 is a detail view of the vaporizing-chamber and the blowpipe or injector. Fig. 6 is a longitudinal section of a thermocauterizing-iron having the cauterizing-point at the side. Fig. 7 is a view in perspective of an apparatus to be used exclusively in veterinary surgery. Fig. 8 is an under side view of Fig. 7. Fig. 9 is a longitudinal section of Fig. 7. Fig. 10 is a longitudinal section of a modified form of the apparatus shown in Figs. 7, 8, and 9. Fig. 11 is a section on the line 1 2 of Fig. 10. Fig. 12 is a section on the line 3 4 of Fig. 10. Figs. 13 and 14 represent two modified forms of the cauterizing-point. Fig. 15 is a section on the line 5 6 of Fig. 13.

Referring to Figs. 1 to 5, my apparatus includes, essentially, a cylindrical reservoir $a$, in brass or other suitable metal, and which also serves as a handle. The said handle, which can be heated to a high temperature, is surrounded by an ebonite case $a'$, held between a fixed abutment $b$ and a nut $b'$. A certain amount of space is left between the tube $a$ and the case $a'$, and as the latter is provided with perforations the air circulates in the annular space, whereby the handle is being constantly cooled.

At the upper end of the tube $a$ is screwed a metallic chamber $e$ and which constitutes the vaporizing-chamber, which communicates with the reservoir $a$ by means of a small opening $e'$, which can be more or less closed by the conical end of a needle or regulator $d$. The said needle is in line with the axis of the apparatus and is controlled from the outside by screwing it more or less into the nut $c$, which closes the tube $a$ at the lower end of the handle.

Onto the chamber $e$ is fixed a blowpipe or injector $g$, provided with a capillary orifice $g'$. To prevent obstruction in the said orifice, I arrange in front of the blowpipe and in the chamber $e$ a strainer formed by a tube $h$ in copper or other malleable and ductile metal and which is fitted in any suitable manner to the duct of the blowpipe, the free end being flattened down in order to reduce the cross-section to a simple slit $h'$, the width of which is smaller than the diameter of the opening in the blowpipe. The said strainer does not choke, or rarely so, for the impurities settle down in the corners of the chamber. Furthermore, the strainer can be easily cleaned or replaced. Again, onto the vaporizing-chamber $e$ is screwed a metal case $f$, which forms a combustion-chamber in its intermediate part and the cauterizing-point itself at its end $f'$, made, preferably, of a platina tube. In line with the axis of the said combustion-chamber $f$ is screwed a platina tube $l$, having small perforations at its upper end, its lower end receiving directly the jet of the injector $g$. The combustion-chamber $f$ is provided all around and a little above the blowpipe with perforations $m$ for the ingress of air. The mixture of air and ether passes into the tube $l$, ignites in coming into contact with the walls of the platina tube, (which walls remain constantly incandescent, as will be shown hereinafter,) and the gases of combustion are exhausted through the vent-holes $m'$.

When using my apparatus, the reservoir $a$ is filled with ether, alcohol, or any hydrocarbon. The instrument is held in a horizontal position and with the vaporizing-chamber $e$, case $f$, and the cauterizing-point $f'$ held over a flame of alcohol, the regulator $d$ being opened a little. A small quantity of ether escapes, becomes vaporized in the chamber $e$, passes into the injector, gives rise to an ingress of air, and the combustible mixture ignites, but without bursting into a flame, by coming into contact with the heated walls of the cauterizer. The tube $l$, which is excessively thin, is immediately brought to incandescence by the combustion of the chief parts of the mixture and the cauterizing-point $f'$ becomes red-hot. Then the apparatus may be taken from off the spirit-lamp, when it continues to work. The vacuum produced in the vaporizing-chamber by the injections of the blowpipe determines in the reservoir $a'$ an active vaporization, and the same effects of the ingress of air and of the flameless combustion through contact with the incandescent walls of the platina tube $l$ obtain so long as the reservoir $a$ is able to supply combustible. The burned gases exhaust through the vent-holes $m'$. The heating process is regulated at will by means of the needle or regulator $d$, which also allows of the working of the apparatus being stopped.

It must be particularly observed that the thermocauterizing-iron works without there being any flame at all, which is of the utmost importance in that which concerns the facility, management, and success of cauterizing operations.

Fig. 6 represents a thermocauterizing-iron which operates in the same manner as the one I have just described, but in which the cauterizing-point, instead of being a straight extension of the handle, is placed at a right angle with respect to the latter, as is usually the case in cauterizers. In this case the vaporizing-chamber $e$ is also arranged at right angles to the handle. A shank of the said chamber and in which is provided the opening $e'$ to give ingress to the combustible is screwed directly on the upper end of the tube or reservoir $a$. Thus the blowpipe or injector and also the tube $l$ occupy a horizontal position, their longitudinal axis coinciding with that of the vaporizing-chamber.

The straight thermocauterizing-iron shown in Fig. 1 is intended for use in human surgery alone, while that having the cauterizing-point at the side may be used either in human or veterinary surgery by screwing onto the vaporizing-chamber cauterizing-points of suitable shape. In view of its possible use in veterinary surgery the thermocauterizing-iron shown in Fig. 6 has a rather long handle, the lower part of which forms a handpiece of larger diameter.

Figs. 7, 9, and 10 represent two modified forms of a thermocauterizer for use in veterinary surgery alone. In both cases the cauterizing-point is arranged at a right angle with respect to the handle. In the said figures the same letters refer to parts which correspond to those of the thermocauterizing-iron hereinbefore described. Onto the upper end of the tube $a$ is screwed the vaporizing-chamber $e$, an extension of which is the blowpipe or injector $g$, provided with a capillary orifice $g'$, the direction of which is at right angles with respect to the handle of the apparatus. Onto the vaporizing-chamber $e$, of somewhat conical shape at the outside, is fitted, so as to hold on by friction, the head of a square in metal or alloy, such as iron, steel, cast-iron, malleable cast-iron, bronze, or the like. In a recess of the said head $n$ is engaged the free end of the blowpipe, so that the capillary orifice $g'$ of the blowpipe comes just opposite a tube $l$ made in one arm of the square, which arm is either integral with or screwed onto the head $n$. This arm, or the pipe formed by it, is cylindrically smaller at a certain part of its free end and has at its base a threaded abutment, against which are screwed the hollow changeable pieces $f$ in any metal or alloy able to support high temperatures and as little liable as possible to corrosion under such high temperatures. The said hollow pieces $f$ form the cauterizing-points, and as they must be somewhat bulky they cannot be made in platina, the cost of such a metal being much too great. The property which platina has of remaining incandescent when once the thermocauterizing-iron has been put in working order and which allows of the latter operating without there being any flame cannot in this case be turned to account. Here the combustion-chambers are larger, so as to allow of the formation of a flame in them by the combustion of the hydrocarburet, the said flame heating directly the cauterizing-point and maintaining it at the required temperature. The gases of combustion exhaust through the vent-holes $m'$, provided around the chambers $f$, the air drawn in entering by the orifice $m$ left in the cork $p$, which closes the head $n$ on that side.

The pieces or cauterizing-points $f$ are of the different shapes used in practice. They may be conical, as in Fig. 14, or in the form of a knife-blade or wedge, as in Figs. 13 and 15, or in the shape of a ball or other shape. A separate cauterizing-point $f'$ may be fixed in place to the piece $f$ by screwing into the same, as shown in Figs. 7 and 9, or the said cauterizing-point $f'$ may be movable, as shown in Fig. 10. In this case the point is moved in line with the axis of the chamber $f$ by means of a lever $q$, fixed by a collar $q'$ to the handle $a$ and embracing the upwardly-extending shank of the point $f'$ with its eye $f^2$. With this arrangement the lever $q$, which is in the form of a spring, holds the said point $f'$ back in the chamber $f$ when not acted upon by the hand of the operator. The said point is quickly heated to the required temperature, and when using it the operator has only to press on the lever $q$, while holding in his hand at the same time the handle $a$. Lastly, I may arrange a guard $r$, fixed to the tube $a$ and bent toward the point $f'$ and embracing it without touching the combustion-chamber. I thus prevent the shoulder $f^3$ of the piece $f$ from cauterizing the skin when the apparatus is being used. By giving to the piece $f$ the shape of a knife or wedge, as shown in Figs. 13 and 15—that is to say, the shape of a soldering-iron—the thermocauterizing-iron becomes a soldering instrument, which may be conveniently used by tinmen, plumbers, and the like.

Having now particularly described and ascertained the nature of my said invention, I declare that what I desire to secure by Letters Patent is—

1. In a thermocauterizer the combination of a liquid-reservoir in the handle of such cauterizer, a vaporizing-chamber connected to the reservoir, a conical opening between the reservoir and the vaporizing-chamber, a conical valve for controlling said opening, a combustion-chamber, an injector-blowpipe between said chambers having a capillary outlet, a cauterizing-point, and a combustion-tube in line with the capillary outlet and constituting means for heating the cauterizing-point.

2. In a thermocauterizer the combination of a liquid-reservoir in the handle of such cauterizer, a vaporizing-chamber connected to the reservoir, a conical opening between the reservoirs and the vaporizing-chamber, a conical valve for controlling said opening, a combustion-chamber, an injector-blowpipe between said chambers, a strainer between the vaporizing-chamber and the injector, a cauterizing-point, and a combustion-tube in line with the capillary outlet and constituting means for heating the cauterizing-point.

3. The combination of reservoir $a$, vaporizing-chamber $e$, a valve between said reservoir and chamber, combustion-chamber $f$, injector $g$ between said chambers, tube $l$ in line with the injector, and point $f'$ surrounding tube $l$, there being a space between the tube and point as set forth.

4. An improved thermocauterizer, consisting of a tubular liquid-reservoir forming the handle of the apparatus, in combination with a separate vaporizing-chamber secured to said reservoir-handle, and provided with an opening for the ingress of liquid from the reservoir, a hollow metallic cauterizing-point secured to the vaporizing-chamber, and an injector-blowpipe connected with said chamber inclosed in said point and opening into the same, and a tube connected with the inlet of the injector and having a contracted inlet-opening inclosed in the vaporizing-chamber, substantially as described.

5. An improved thermocauterizer, consisting of a tubular liquid-reservoir forming the handle of the apparatus, in combination with a separate vaporizing-chamber secured to said reservoir-handle, and provided with an opening for the ingress of liquid from the reservoir, an injector-blowpipe connected with said chamber, a metal case attached to said chamber and inclosing said blowpipe, and forming with its tip the combustion-chamber and the cauterizing-point, a pipe inclosed in said case with its inlet opposite the outlet of the blowpipe, and its outer extremity constructed of platina, and said case having a series of perforations between said two pipes for the admission of air, and another series of perforations opposite the platina-tipped pipe for the egress of burned gases, substantially as described.

6. An improved thermocauterizer, consisting of a tubular liquid-reservoir forming the handle of the apparatus, in combination with a separate vaporizing-chamber secured to said reservoir-handle, and provided with an opening for the ingress of liquid from the reservoir, a conical valve for controlling said opening, a cauterizing-point of substantially non-fusible and non-corrodible metal secured to the vaporizing-chamber, and an injector-blowpipe having a capillary outlet and connected with the vaporizing-chamber.

7. An improved thermocauterizer, consisting of a tubular liquid-reservoir forming the handle of the apparatus, in combination with a separate vaporizing-chamber secured to said reservoir, and provided with an opening for the ingress of the liquid from the reservoir, a conical valve for controlling said opening, an injector-blowpipe connected with said chamber, a tube connected with the inlet of the injector, and having a contracted inlet-opening inclosed in the vaporizing-chamber, a metal case attached to said chamber, and inclosing said blowpipe and forming with its tip the combustion-chamber and cauterizing-point, a pipe inclosed in said case with its inlet opposite the outlet of the injector and its outer extremity constructed of platina, and said case having a series of perforations between said two pipes for the admission of air, and another series of perforations opposite the platina-tipped pipe for the egress of burned gases, substantially as described.

In witness whereof I have hereunto set my hand in presence of two witnesses.

JEAN BAPTISTE DECHERY.

Witnesses:
GEO. LAURENT,
EUGÉNE WATTIER.